Figure 5:
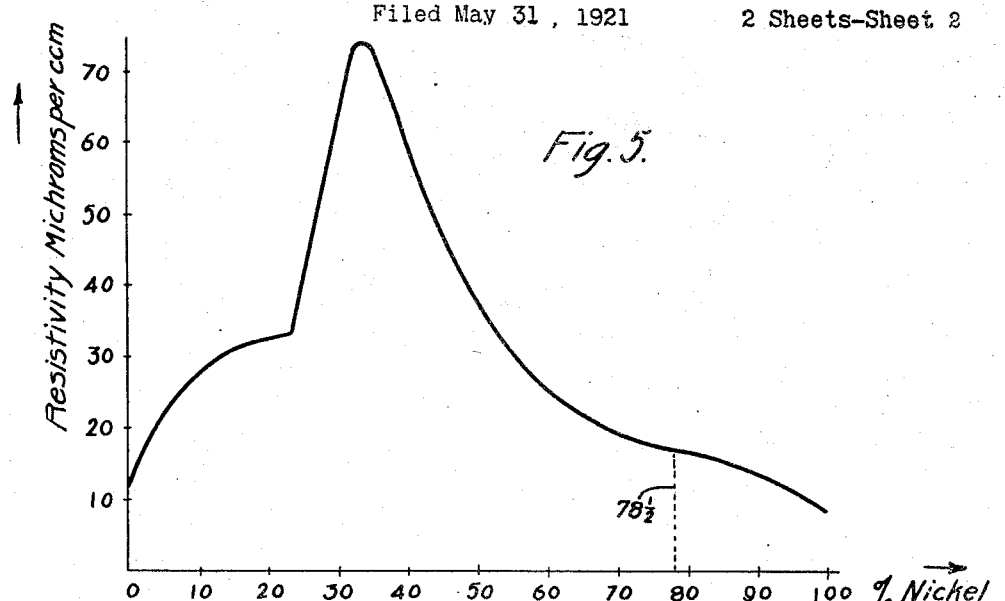

June 1, 1926.
G. W. ELMEN
MAGNETIC MATERIAL
Filed May 31, 1921          2 Sheets-Sheet 1
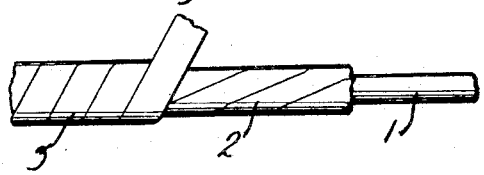
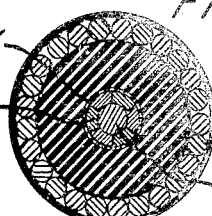
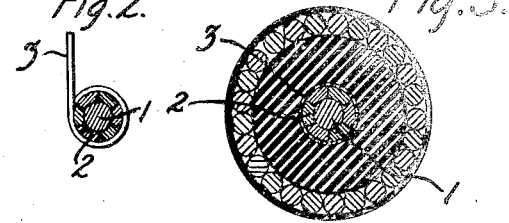
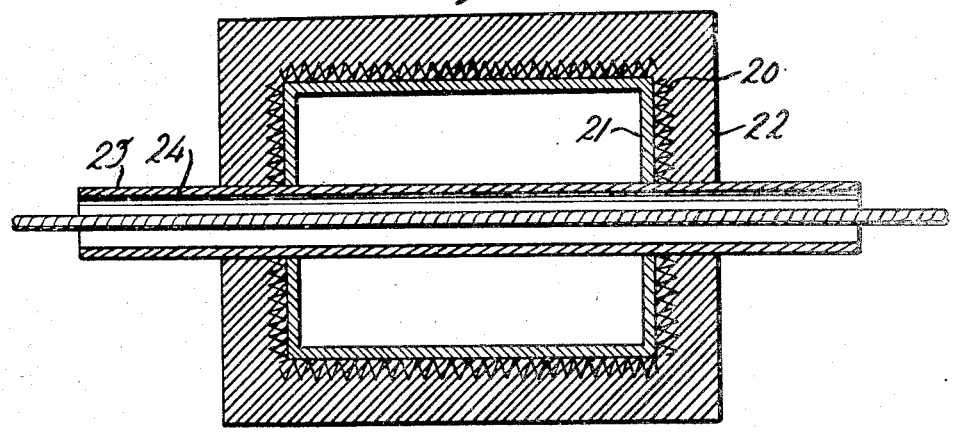
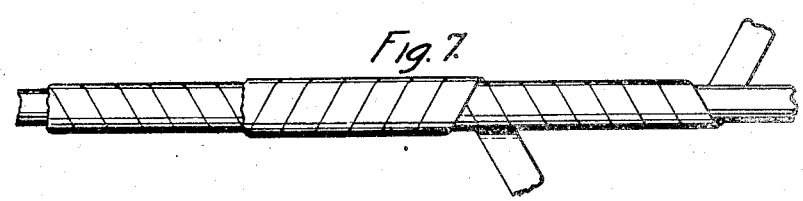
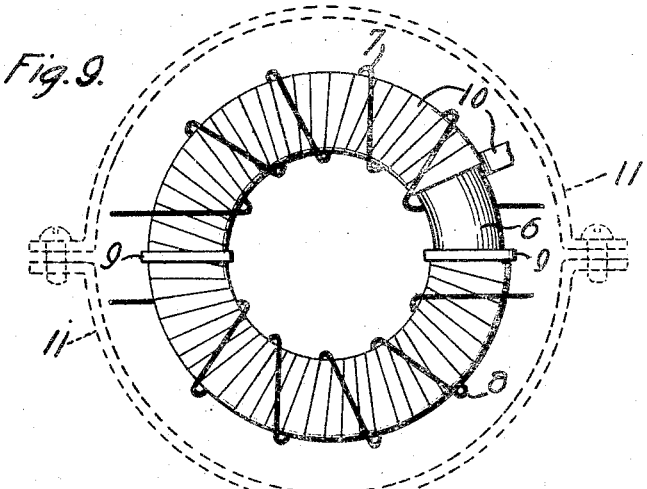
Inventor:
Gustaf W. Elmen,
by Joel C. R. Palmer Atty.

Inventor:
Gustaf W. Elmen,
by Joel Ch. Palmer,
Atty.

Patented June 1, 1926.

1,586,884

UNITED STATES PATENT OFFICE.

GUSTAF W. ELMEN, OF LEONIA, NEW JERSEY, ASSIGNOR TO WESTERN ELECTRIC COMPANY, INCORPORATED OF NEW YORK, N. Y., A CORPORATION OF NEW YORK.

MAGNETIC MATERIAL.

Application filed May 31, 1921. Serial No. 473,877.

This invention relates to the production and use of a new material or substance having certain desirable magnetic qualities, among which are high magnetic permeability, especially at low magnetizing forces, and low hysteresis loss. It is one object of this invention to provide a suitable loading material for signaling conductors to increase their range and speed of operation. Another object relates to applying this loading material to a conductive core in a manner to produce a highly efficient transmission line for long range, high speed signaling. These objects and other objects will become apparent on consideration of examples of practice thereunder which will be disclosed specifically in this specification, with the understanding that the definition of the invention will be given in the appended claims.

This application is in part a continuation of application, Serial No. 111,080, filed July 24, 1916.

The importance of iron in the practical application of electricity is well known and has often been remarked upon. Its unique quality of high magnetic permeability has made it indispensable for the cores of tractive electro-magnets for dynamos, motors, telephone receivers, telegraph relays, etc. For this purpose it may, in certain cases, be advantageously united with a very small proportion of some other element, for example silicon. With this qualification it may truly be said that the high permeability of iron makes it practically the only medium to be considered for the translation of energy of the electric current into useful mechanical effect, and for the reciprocal translation of mechanical energy into electric current. In dynamoelectric machines it is common to have laminated iron cores subject to resultant magnetizing forces of the order of 2 to 5 or more c. g. s. units and to develop magnetic fluxes in these iron cores of the order of 10,000 to 20,000 lines per square centimeter of cross-section. Much attention has been given to obtaining a quality of iron of high permeability for magnetizing forces and flux densities of the orders here mentioned. On this quality of iron depends its effectiveness in most electromagnets.

Silicon steel exhibits magnetic qualities superior to ordinary iron in some respects, but its employment is limited by its comparative brittleness and the difficulty of working it. A good quality of soft iron has been commonly employed as the best magnetic medium for general use for tractive electromagnets. The principal possible rivals of iron, nickel and cobalt, are far below it in permeability at the magnetizing forces involved in such apparatus. With nickel and cobalt, in this respect, stands Heusler's alloy of aluminum, manganese, and copper. It has been found that a composition of about ⅔ nickel and ⅓ copper, when tested at low magnetizing forces, gives a permeability higher than that of iron alone. It will be seen that with the exception of aluminum, all these metals stand close together in their atomic weights and atomic numbers and in this specification the five elements, manganese, iron, cobalt, nickel and copper, having the consecutive atomic numbers 25, 26, 27, 28 and 29 will be referred to as constituting the magnetic group of elements.

The criterion of high permeability is not the only one to be considered in seeking the best magnetic material. If the magnetizing forces and the resultant flux are changed rapidly, then for most purposes the material should exhibit a low hysteresis loss. The development of eddy currents under these conditions may be obviated to a considerable extent by lamination, but the resistivity of the material is a factor that may be of importance in this connection; the higher the resistivity, the more the eddy current loss will be kept down.

Magnetic material has important uses aside from its use in tractive electromagnets. An obvious example is for the cores of alternating current transformers. In many situations it is desirable to increase the inductive reactance of an electric conductor and for this purpose magnetic material is placed in the field of magnetic force associated with the conductor. This is the principle of choke coils, and of the loading coils which are employed in telephone transmission circuits.

In telegraphy and telephony the electric currents are exceedingly small compared to those encountered in the transmission and transformation of power. Hitherto a common practice in increasing the inductance of signaling conductors has been to wind these conductors many times in series turns on an iron core, in the form of "loading coils."

Since Heaviside discussed the question about 1890, it has been well understood that an ideal way to improve signaling conductors would be by continuous loading, that is, by enveloping the conductor with a layer of magnetic material throughout its length. One trouble has been that with the low magnetizing forces found in signaling conductors, and the low permeability of known magnetic materials at these forces, the induction in the loading layer was too slight to be useful for long telegraph cables. Generally speaking, it was found that better results in transmission would be secured by devoting the available cross-section entirely to copper instead of part to copper with the remainder an iron layer. Accordingly, to the present time, although there have been many suggestions for continuous loading, it has been found of no advantage for any purpose except for a few comparatively short, submarine telephone transmission lines. In a few instances of this class, continuous loading with iron has been employed advantageously. It has not been made useful hitherto in telegraphy.

This invention provides a new magnetic material comprising elements of the magnetic group combined in suitable proportions, which, when subjected to a proper heat treatment and guarded against undue stresses and other disturbing causes develops and retains an extremely high permeability at low magnetizing forces, and a low hysteresis loss. This material has furthermore been applied with advantage to the continuous loading of signaling conductors in such a manner as to obtain the full benefits of the above noted desirable properties.

The practice of this invention comprehends considerable variety in the composition and preparation of the magnetic material, the manner of its application for loading material and other purposes, the safeguards against impairment of its magnetic property, etc. An example of procedure, according to the invention, will now be disclosed by which its utility may be realized to advantage. This disclosure will be made specific to this example, with the understanding that generic aspects of the invention may be comprehended in the terms of the appended claims.

Figure 6:
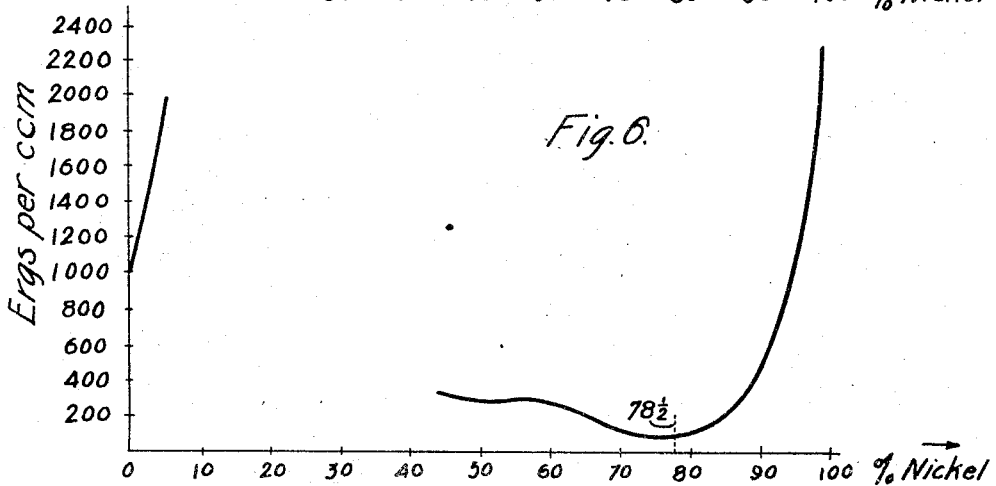
Figure 8:
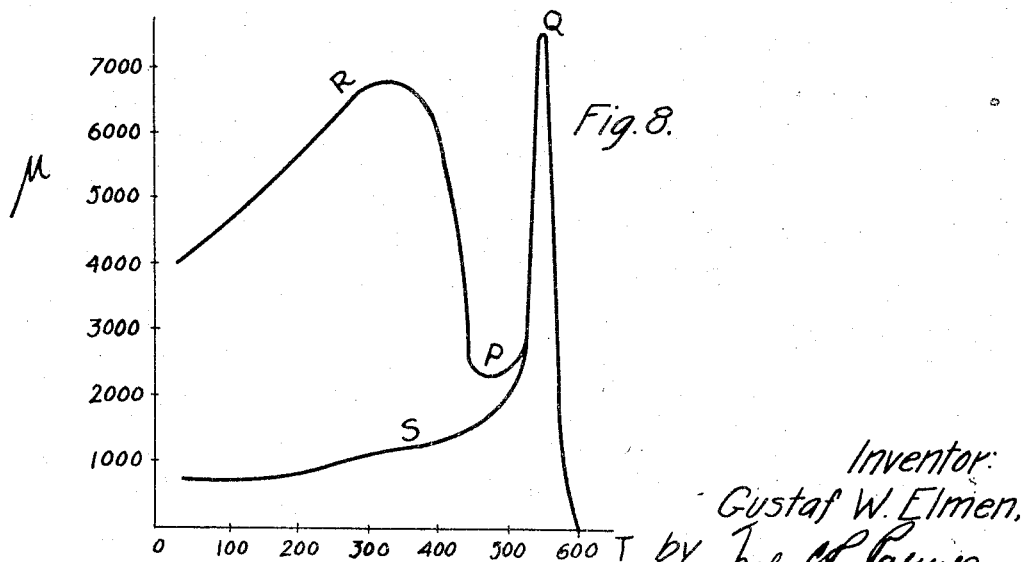

Referring to the accompanying drawings, Figure 1 is an elevation of a conductor loaded with the improved magnetic material of this invention; Fig. 2 is a cross-section of the same; Fig. 3 is a cross-section of the same conductor embodied in a submarine cable; Fig. 4 is a section of a furnace for heating the loaded conductor; Fig. 5 is a curve showing the relation of resistivity to percentage composition for a certain loading material of my invention; Fig. 6 is a curve for hysteresis loss; Fig. 7 is an elevation of a conductor wrapped doubly with the magnetic material; Fig. 8 is a curve showing the permeability-temperature characteristics for a variety of the magnetic material; and Fig. 9 shows a loading coil with its core of this material and its winding indicated diagrammatically.

Iron and nickel are fused together in an induction furnace in the proportion of about 21½ per cent of iron and 78½ per cent of nickel. Good commercial grades of these two metals are suitable for this purpose. The molten composition is poured in a mold and cooled to form a thick bar or rod. This is subjected to repeated swaging operations by which it is reduced in diameter and correspondingly elongated. The long rod thus formed is then drawn out by repeated wire drawing operations to a size of about No. 20 B. and S. gauge. This wire is then passed between flattening rolls, and by several such operations, it is flattened to a tape of the thickness of about 0.006 inch and width a little more than 0.125 inch. This tape is passed through cutting rolls or discs which trim its edges squarely on both sides and give the tape an exact and uniform width. This tape of nickel-iron composition is now ready for application upon a conductor.

The stranded copper conductor of Figs. 1 and 2 comprises the central cylindrical wire 1 enveloped by six equal helical strands 2, which are shaped to fit together closely to form a cylindrical annulus about the wire. It is desirable that the conductor assembled in this way shall have a smooth cylindrical contour, and for this purpose it may be drawn through a die or subjected to a swaging operation. The stranded conductor as described, has the advantages of flexibility and preservation of conductive continuity in case of a breakage by any stress not severe enough to interrupt all the strands at the same place. This stranded conductor 1—2 is of size No. 5 B. and S. gauge, and is to be loaded with the improved magnetic material in the form of the tape heretofore described.

The nickel-iron tape 3 is wrapped helically on the stranded copper core, care being taken to abut the edges closely without lapping.

The taped conductor is next to be heat-treated. For this purpose it is drawn lengthwise straight through the furnace of Fig. 4, which is maintained at a temperature of about 875 degrees centigrade. This is a muffle furnace with the heating elements 20 between the fire clay muffle 21 and the fire brick 22. Around the fire brick 22 is a sheet iron outer wall. The iron tube 23 has a copper lining 24 of inside diameter a little over half an inch. It extends clear across the furnace and projects 8 inches beyond the furnace walls at each end. The length of the pass through the furnace is about two feet, and the rate of movement of the conductor therethrough is about ¾ foot per minute. As the taped conductor passes from the furnace and the projecting end of the tube 23—24, it cools in the air, which outside the tube 23—24 is at about normal room temperature, that is, about 20 degrees centigrade. Under the conditions and for the dimensions as described, this gives a proper rate of cooling. After heating in the furnace the conductor should be led away straight from the furnace far enough for it to become well cooled; bending at this stage may impair its high permeability. Also, the necessary coiling thereafter should be on a large radius, not less than 2 feet; the stresses and strains involved in coiling and uncoiling on a smaller radius may spoil the permeability.

To develop the utmost possible permeability according to this invention, the rate of cooling after the heating in the furnace is a matter of considerable importance. For the signaling conductor above described, the utmost possible permeability is not particularly desirable, and an effective permeability of 2400 which is sufficient for the purpose, will be developed by cooling in air as the taped conductor emerges from the furnace. For some cases, of which an example will be described later, a more exact procedure with respect to the rate of cooling, is contemplated. After the heat treatment, the taped or loaded conductor is insulated, armored, and mechanically reinforced, according to the usual practice for submarine cables, by surrounding it with a layer of gutta percha and the usual wrapping of jute and the sheath of adjacent helical steel wires, giving the product shown in cross-section in Fig. 3.

While a certain speed and temperature with a certain type of furnace have been described to produce the desired results in the case of a particular conductor, it is apparent that these factors may be varied or adjusted to meet different cases, such for example, as a conductor of different diameter from that here discussed.

While 78½ per cent and 21½ per cent have been mentioned as giving the proportion of the ingredients, nickel and iron, to be employed in making up the improved magnetic material, it will be understood that the proportion may deviate considerably from these figures when nickel and iron are the only ingredients, and that when there are other ingredients, this proportion may not apply. Up to the present time, when the only ingredients are nickel and iron, it has been found that a proportion about the same as that named, gives the highest permeability for low magnetizing forces. Other ingredients than nickel and iron may be employed for various purposes, not only to confer high permeability on the product but for other objects; for example, it may be desirable to add chromium for the reason that a comparatively small quantity of this element will cause a decided increase in the resistivity of the composition, and this high resistivity may be a desirable factor to cut down the eddy current losses in the loading material. A composition of nickel 55 per cent, iron 34 per cent, and chromium 11 per cent has been carefully prepared, heat-treated, and tested, and has been found to give a high value of permeability at low magnetizing forces.

When this material was tested in the form of pancake coils hereinafter described, the permeability of the composition at very low magnetizing forces was 1000 or more, which is much higher than the figure for iron. A superior silicon steel gives a permeability at forces approaching zero of only about 400. Thus it will be seen that with the addition of chromium in considerable quantity, the composition still has a decidedly higher permeability than iron, though perhaps somewhat less than might be attained if the chromium were not present. The resistivity of the composition containing chromium, just referred to, is 100 microhms per cu. cm., whereas, the resistivity of iron is only about 11 microhms per cubic centimeter, and the resistivity of the composition of nickel 78½ per cent and iron 21½ per cent is about 17 microhms per cubic centimeter (see Fig. 5).

Measurements of the permeability of nickel-iron compositions of other proportions than that here stated have shown that the departure may be considerable without serious impairment of the permeability. Thus, using pancake coils, for 70 per cent nickel instead of 78½ per cent, after proper heating and cooling, the permeability at forces approaching zero, is about 4100, and at a magnetizing force of 0.2 c. g. s. unit the permeability is about 15,000 whereas for a percentage of 78½ the respective values of permeability are 7000 and 38,500. It will be seen that these values are much higher than for silicon steel at the same magnetizing forces, which has respective permeabilities of only about 400 and 1500. Thus a wide departure may be made from the proportion named, yet the permeability at low magnetizing forces will be far greater than for the best materials of the prior art.

It has already been mentioned that after the proper heat treatment the composition should be guarded against undue stresses and strains. When the percentages are nickel 78½ and iron 21½, the material can be bent with less impairment of permeability than when the percentages are respectively 70 and 30. In other words, the optimum percentage seems to be more rugged against impairment of permeability by stresses and strains than the other percentage. However, the difference is not marked and apparently, if the material can be guarded against stresses and strains, this difference is of no great consequence.

The maximum attainable permeability for the nickel-iron composition at percentages of 78½ and 21½ respectively for the nickel and iron has been between 6,000 and 9,000 for zero magnetizing forces. This value, which is designated the initial permeability, is obtained by determining a series of values for exceedingly low forces, say of the order of 0.01 to 0.05 c. g. s. units. The results plot linearly, and may be extrapolated back to the value for H=0, thus giving the value of the permeability at zero magnetizing force. The maximum permeability so far attained is between 45,000 and 60,000. This occurs with the 78½ per cent nickel composition at a magnetizing force of about 0.1 c. g. s. unit, and the corresponding value of the induction B being from 4,500 to 5,000 c. g. s. units.

The qualities of the new magnetic material exemplified by the nickel-iron composition are evidently not obtained by taking the mere sum or average of the qualities of its components. Not only is the permeabilty at low forces much greater than for either ingredient (nickel or iron) alone, but the ingredient (nickel) having the lower permeability alone is the major constituent of the composition, while iron, which alone is the best magnetic material previously known, here enters into the composition only to the extent of less than a fourth part.

It is worthy of note that the proportion of the ingredients of the nickel-iron composition which gives maximum permeability at low forces and minimum hysteresis loss is also the proportion that gives zero magneto-striction in strong magnetic fields (H=50 to H=500). While the heat treatment may not necessarily be the same for the manifestation of these phenomena, the coincidence of the proportion is significant of a fundamental unique character in the composition which attains its maximum expression at that proportion.

The resistivity of the nickel-iron composition of this invention is considerably higher than that of either of its components, and corresponds approximately to the curve given in Fig. 5. Thus at 78½ per cent nickel it will be seen that the resistivity is fully 50 per cent higher than for either nickel or iron alone, Evidently a smaller proportion of nickel gives a decidedly higher resistivity and it may be desirable in certain cases to sacrifice permeability for the sake of resistivity. Mention has already been made that for some purposes the utmost attainment of permeability is not necessary, and in such cases it may be better to decrease the proportion of nickel so as to give a point higher up on the curve of Fig. 5. The resistivity when the nickel content is 30 or 35% is seen to be about 75 and for 25% nickel, at about which point the permeability of the alloy at low magnetizing forces begins to be greater than for iron, the resistivity is about 30, that for iron being about 10.

Fig. 6 shows the hysteresis loss for actual samples of the improved composition for percentages of nickel varying over a wide range. The ordinates in this curve give the work in ergs per cubic centimeter represented by the usual hysteresis loop for a maximum induction of 5,000 c. g. s. units per square centimeter of cross-section.

It will be seen that at 78½ per cent nickel, the value is as low as 100 ergs. It will be noted that this percentage for minimum hysteresis loss is the same as for maximum permeability. The low result for the nickel-iron composition at this percentage will be seen to be much lower than the values for other magnetic materials. Thus for a superior quality of iron, the value is as high as 925 and for nickel it is no less than 2,200.

A description has been given of the dimensions of the conductive core and the width and cross-section of the loading tape specifically for a certain contemplated example of a long ocean cable for high speed telegraph transmission. It will be readily understood that the thickness of the tape and other factors may be altered to suit various cases. In some cases where a thicker sheath is desired, it may be best to apply it in the form of two tapes wound in opposite directions, one outside the other as indicated in Fig. 7. Among the advantages of this construction are that it applies the loading sheath in two laminae instead of one, thus reducing the eddy current losses. Also, the opposite winding gives a somewhat more rugged structure for handling, the tape being less likely to slip or buckle. When more than one lamina of loading material is used, the thin coating of oxide on each serves as insulation to reduce the eddy currents, but other insulating coatings may be applied to the loading material if desired.

An ocean cable, 2000 nautical miles long, and loaded as described, may be operated as a telegraph conductor at a one-way speed, approximately ten times as great as for the present one-way operation of unloaded ocean cables of that length. No ocean telegraph cables have heretofore been loaded, either continuously or by loading coils. With the loading materials heretofore available, it was better to fill the available cable cross-section within a given insulating envelope entirely with copper, rather than to devote part of that space to loading material. By this invention there is provided a magnetic material of such high permeability that it is advantageous to cut away part of the copper within the available cross-section, that is, to cut away a cylindrical shell only 0.006 inch thick, and replace it by this material. By this means the speed of the long telegraph conductor may be increased in the ratio just mentioned.

The copending application of Oliver E. Buckley, Serial No. 492,725 filed August 16, 1921, discloses and claims a long submarine telegraph cable loaded with the material of this invention.

The mere intimate union of the ingredients of the new magnetic material may not be sufficient to cause it to exhibit the useful property of high permeability at low magnetizing forces to the degree mentioned. Proper heat treatment may be necessary to attain that degree of permeability.

In general, so far as investigations have gone, it has been found preferable to heat the described nickel-iron composition at least as hot as 825° C. and then cool it down at the proper rate, not too fast but fast enough. This proper rate of cooling is attained in the example described specifically, by a rather ordinary procedure of cooling in air.

The foregoing discussion of the matter of the heat treatment affords guidance by its detailed presentation of a specific example, but it may be helpful to go over the matter for a different example.

Assume that one has obtained a composition of the desired ingredients in the desired percentage relation, but that he does not know what its previous history has been with respect to heat treatment, and that he wishes to develop the utmost permeability for low forces. It has been found convenient for testing purposes to take lengths of something like 40 feet of tape of cross-section 0.125 inch by 0.006 inch and wind these lengths into pancake coils about three inches in outside diameter with a layer of paper between the successive turns. The paper may then be expelled with an air blast, thus assuring that the turns of the metal tape are sufficiently loose to guard against undue stresses and strains therein. These pancake coils are evidently conveniently available for testing for permeability by the well-known method involving the use of a ballistic galvanometer. The first step will be to heat a series of specimens of this composition to a temperature around 900 degrees centigrade and hold them there for a long enough time to be assured that they have attained this uniform temperature throughout. There will be no objection to heating the specimens somewhat hotter and it may be easier in this way to become assured that the temperature is sufficiently high throughout.

The improved magnetic material here under discussion has a so-called "critical temperature" or "magnetic transition temperature," like iron and other magnetic materials. If it is heated from normal temperature to higher and higher temperatures and subjected to low magnetizing forces its permeability increases to a peak and then falls off and vanishes very abruptly and the temperature where this last change takes place is the so-called "critical temperature" (page 116 of the 1900 edition of Ewing's Magnetic Induction in Iron and Other Metals). This magnetic transition temperature for the improved magnetic material of this invention will be considerably below the temperature of 900 degrees that has just been mentioned in a preceding paragraph, and it will be different for different compositions, and when the ingredients are nickel and iron it will be different for different proportions of the ingredients. Generally speaking, this magnetic transition temperature will lie around 500 degrees C. or 600 degrees C. and may be somewhat more or less than these figures.

Having heated the specimens thoroughly to a temperature of at least 900 degrees C., they are next cooled down to a temperature near this magnetic transition temperature, preferably a temperature a little higher than the magnetic transition temperature. For a composition of nickel and iron only, with from 55 per cent nickel to 80 per cent nickel, this critical temperature will lie between 550 degrees C. and 625 degrees C. The rate for cooling from 900 degrees C. down to this point should be conveniently gradual say twenty minutes may be required for this stage with a pancake coil of loosely wound nickel iron tape as heretofore described. No harm can be done by cooling too slowly through this stage from 900 degrees down.

Next the specimens are to be cooled down through a temperature zone that will carry them distinctly lower than the magnetic transition temperature at a rate which is desired to be fast enough and yet not too fast. They should not be cooled so rapidly as to set up undue stresses and strains, for if this is done the permeability will be less than the utmost attainable.

On the other hand they should not be cooled too slowly, that is they should be cooled fast enough so that at normal temperatures they will exhibit the highest permeability that can be developed therein.

Assuming as heretofore suggested, that the test is being made with a whole series of like specimens treated alike to the point of cooling down to the magnetic transition temperature, these specimens may be cooled at different rates from that point down to say about 300 degrees, then cooled at any convenient rate the rest of the way down to normal temperature, and then tested to see which of them has had the highest permeability developed therein. The results obtained will be reproducible, so that in this way the optimum rate of cooling in the stage from the critical temperature down, may be accurately determined.

An examination of a series of specimens in accordance with Fig. 8 may be helpful. This figure is particularly for a nickel-iron composition of 70 per cent nickel. When subjected to a constant magnetizing force of $H=0.03$ and heated up according to the temperatures represented as abscissæ and with the corresponding values of permeability $\mu$ plotted as ordinates, a curve like R is obtained provided that the cooling from the critical temperature down was at the optimum rate. On the other hand, if the cooling was too fast or too slow, the curve may be like S.

This means that for a composition in which the high permeability has been developed, the curve R will exhibit a high value of induction for moderate temperatures but will drop to an intermediate minimum as at P before going to the well known maximum Q that precedes the attainment of the critical temperature, which in this case is about 600 degrees. On the other hand, if the desired permeability has not been developed in this specimen the curve will be like S, showing no such intermediate minimum as at P.

To sum up briefly, the specimen should be cooled through the stage from the critical temperature down at a rate not too fast and yet fast enough to develop the highest permeability at normal temperatures with low magnetizing forces. This rate may be readily determined by testing a series of specimens at different rates, and guidance may be afforded by noticing whether a test according to Fig. 8 gives a curve similar to R, having an intermediate minimum as at P, instead of such a curve as S, having no such intermediate minimum.

In connection with the foregoing, it should be remembered, (1) that for many purposes the utmost permeability is not necessary nor desirable; (2) that the rate of cooling that gives the utmost permeability is not exactly and narrowly determined, but that other rates of cooling not widely different will give almost or quite as great permeability, (3) that a little practice along the line of Fig. 8 will enable one very quickly to recognize the best procedure to obtain the utmost permeability, and (4) that if it is not convenient to carry a plurality of test samples through different rates of cooling, a single sample can be taken over the same temperature range in successive trials at the different rates; in this connection it will be noticed that when the optimum rate has been discovered, the reproducibility of the procedure enables the maximum permeability to be reestablished in the same sample or a like sample.

It may be important to protect the magnetic material from stresses after it has had its high permeability developed by the proper procedure of heating and cooling. Thus, in the case of the loaded cable, it has been found that if an attempt is made to put the tape through a heating and cooling treatment and thereafter apply it to the conductive copper core, the permeability may be impaired. Apparently, the stresses involved in winding the tape upon the conductive core have a tendency to destroy the permeability that has previously been conferred upon the material of the tape. Hence it has been found advisable to conduct the heat treatment after the magnetic material has been assembled in its operative relation to the electric conductor with which it is to be associated.

For the continuous loading of a signaling conductor it is important not only to secure high permeability of the loading material, but it is important that the permeability be uniform. It has required much investigation to determine the necessary conditions of treatment, and these conditions have been presented in this specification.

It has been stated above that it is desirable that the conductor within the loading envelope shall have a smooth cylindrical contour. One reason for this is that at ocean depths, when the cable is subjected to pressures of the order of 5,000 pounds per square inch, if the conductor surface were irregular, the magnetic material might be stressed and strained unequally by the great pressure. The effect on the material of the sheath might be to impair its permeability. Another advantage of the compact structure shown for the conductor, is that it has less electrostatic capacity than if it consisted of loosely assembled strands.

The improved magnetic material of this invention is useful for other purposes than for the continuous loading of signaling conductors. It may be used advantageously for relay armatures and for frequency changers and modulators. It is also useful for lumped loading as well as for continuous loading. Choke coils of very high inductance and low resistance, may be made up in remarkably small volume, with consequent saving of material and labor in manufacture.

Coils with cores of this material have been found particularly valuable for use as magnetic shunts in submarine cable telegraph receiving apparatus. This material is also good for transformer cores, especially those working at low magnetizing forces, such as input transformers for telephone repeaters.

For loading coils, small wire of the magnetic material is insulated and wound into a core in the manner heretofore known for making soft iron cores for loading coils. On this core the windings of the loading coil are mounted. Such a coil is shown in Fig. 9, with the core 6, on which the coil windings 7 and 8 are indicated diagrammatically. In order to give the core material stability or constancy in permeability, even though large currents are superposed on the loading coil circuit, the core may be provided with gaps filled with non-magnetic material 9. The use of the improved magnetic material allows the necessary effective permeability to be secured even with these gaps present. The number and length of these gaps may be regulated as desired. The windings of the wire core 6 may be held together by wrapping the core with tape 10 of non-magnetic material, and the core sections on each side of the non-magnetic gaps, with the winding thereon, may be held together by clamps 11.

Ordinarily, the stresses or strains put upon the nickel-iron wire (assuming that this is the composition of the improved magnetic material employed for the core 6), will not seriously decrease its permeability, provided it has been properly heat-treated before winding, so as to develop its possible high permeability. But if it seems desirable, the formed core can be heated and cooled at the proper rate so as then to develop its permeability.

What is claimed is:

1. A magnetic material characterized by a higher permeability than that of iron at magnetizing forces around $\frac{2}{10}$ gauss or less, comprising two elements of the magnetic group.

2. A magnetic composition comprising at least two elements of the magnetic group and having maximum permeability at less than $\frac{2}{10}$ gauss magnetizing force.

3. A magnetic material characterized by a higher permeability than that of iron at magnetizing forces of $\frac{2}{10}$ gauss or less, comprising nickel and iron, and in which the nickel component is 25 per cent or more of the whole.

4. A magnetic material characterized by a higher permeability than that of iron at magnetizing forces of $\frac{2}{10}$ of a gauss or less, comprising nickel and iron, and in which the nickel component predominates.

5. A magnetic material characterized by a higher permeability than that of iron at magnetizing forces of $\frac{2}{10}$ of a gauss or less, comprising at least two magnetic elements, one of which is nickel, and in which the nickel component is within a few percent of 78½ percent of the magnetic element content.

6. A magnetic material comprising two elements of the magnetic group and having higher permeability than iron at low magnetizing forces developed therein by annealing followed by cooling at a rapid rate from a temperature at or near the magnetic transition temperature.

7. A magnetic material having its hysteresis loss less than 200 ergs per cubic centimeter for a loop for which the limiting value of the induction is 5,000 c. g. s. units.

8. A magnetic material characterized by a higher permeability than that of iron at magnetizing forces of $\frac{2}{10}$ of a gauss or less and lower hysteresis loss than iron, comprising at least nickel and iron of the magnetic group, the nickel being within a few percent of 78½ percent of the nickel-iron content.

9. A magnetic material comprising two elements of the magnetic group, having a permeability higher than that of iron at magnetizing forces of $\frac{2}{10}$ gauss or less, and in combination therewith an electric conductor in inductive relation to said material.

10. The method of developing high permeability at low magnetizing forces in a magnetic material which comprises annealing said material, bringing it to a temperature approximating its magnetic transition temperature, and then cooling at a rate intermediate an annealing rate and a rate at which undue stresses and strains would be set up therein.

11. The method of developing high permeability at low magnetizing forces in a magnetic material which comprises the step of heating it above a certain temperature and then cooling it past that temperature at a rate intermediate an annealing rate and a rate at which undue stresses and strains would be set up therein.

12. The method of developing high permeability at low magnetizing forces in a magnetic material which comprises bringing said material to a temperature approximating its magnetic transition temperature, and then cooling at a rate intermediate that required for annealing and that at which undue stresses and strains would be caused therein.

13. A transmission line loaded for high speed signaling with a magnetic material comprising nickel and iron and having a higher permeability at magnetizing forces of a small fraction of a gauss, than iron.

14. Magnetic composition consisting chiefly of nickel and iron and having a higher initial permeability than iron, the nickel component comprising at least 25% of the whole, in combination with an electric circuit in which magnetizing forces set up by the current therein are around $\frac{2}{10}$ of a gauss or less.

15. A transmission line loaded with a magnetic material having a higher permeability than iron at magnetizing forces of $\frac{2}{10}$ gauss or less.

16. A transmission line loaded with a magnetic material having a hysteresis loss less than 200 ergs per cubic centimeter for a loop for which the limiting value of induction is 5,000 c. g. s. units.

17. A transmission line loaded with a magnetic material comprising nickel and iron having a higher permeability at low magnetizing forces than iron and a lower hysteresis loss than iron.

18. The method of loading signaling conductors which consists in surrounding a conductor with magnetic material, heating said conductor and said magnetic material to a predetermined temperature and then cooling, the loaded conductor being maintained in a substantially straight condition during said cooling.

19. A continuously loaded signaling conductor comprising a conductor surrounded by a plurality of layers of magnetic material, said magnetic material having a surface coating of oxide formed thereon to insulate the layers from each other and from the conductor.

20. A magnetic alloy comprising iron and nickel and in which the nickel component predominates, and having higher permeability than iron at low magnetizing forces developed therein by heating followed by cooling from a temperature at or near the magnetic transition temperature at a rate more rapid than the ordinary annealing rate but not so great as to set up undue stresses in the alloy.

21. The method of loading a signaling conductor which consists in surrounding a conductor with magnetic material, heating the conductor with magnetic material thereon above a certain temperature, and cooling said conductor and magnetic material past that temperature at a rate intermediate an annealing rate and a rate at which undue stresses and strains would be set up in said magnetic material.

22. The method of loading a signaling conductor with magnetic material which comprises forming a layer of the material about the conductor, subsequently heating the magnetic material above its magnetic transition temperature, and cooling it at a rate intermediate that required to anneal and that which would give reduced permeability by setting up internal strains.

23. The method of loading a signal conductor with an alloy containing nickel and iron, the permeability of which alloy at ordinary temperatures is dependent upon preceding heat treatment, which comprises surrounding the conductor with a layer of the alloy, subsequently heating the conductor and surrounding layer of alloy above the magnetic transition temperature of the alloy, and cooling it past that temperature at a rate intermediate that necessary to anneal and that which would set up undue internal strains.

24. A magnetic material characterized by higher permeability than 800 in the entire range of magnetizing forces from zero to $\frac{2}{10}$ gauss, and comprising two elements of the magnetic group.

25. A magnetic material possessing a permeability above 800 in the entire range of magnetizing forces from zero to $\frac{2}{10}$ gauss, and comprising nickel and iron, in which the nickel component is 25% or more of the whole.

26. A magnetic material possessing a higher permeability than 800 in the entire range of magnetizing forces from zero to $\frac{2}{10}$ gauss, and comprising nickel and iron, in which the nickel component predominates.

27. A magnetic material characterized by a permeability above 800 in the entire range of magnetizing forces from zero to $\frac{2}{10}$ gauss, and comprising at least two magnetic elements, one of which is nickel, and in which the nickel component is within a few per cent of 78½% of the magnetic element content.

28. A magnetic material comprising two elements of the magnetic group, characterized by a permeability higher than 800 in the entire range of magnetizing forces between zero and $\frac{2}{10}$ gauss, and in combination therewith an electric conductor in inductive relation to said material.

29. A transmission line conductor continuously loaded with a magnetic material comprising an alloy including nickel and iron, more than 25% of the whole material being nickel, said material having an initial permeability above 300 measured on the conductor.

30. A transmission line conductor continuously loaded with a magnetic material comprising an alloy including nickel and iron, more than 25% of the whole material being nickel.

31. A magnetic material comprising a nickel-iron alloy having an initial permeability permanently higher than 800.

32. A method of loading a signaling conductor with magnetic material, which comprises forming a layer of the material about the conductor, subsequently heating the magnetic material above its magnetic transition temperature, and cooling it at a rate intermediate that required to anneal and that which would give reduced permeability by setting up internal strains, such cooling rate being that which gives the material a permanent initial permeability above 800.

33. A magnetic material characterized by a higher permeability than that of iron at magnetizing forces of .2 of a gauss or less, and lower hysteresis loss than iron, consisting of nickel and iron, the nickel being substantially 78½% of the total material, and the iron being substantially 21½% of the total material.

In witness whereof, I hereunto subscribe my name this 26th day of May A. D., 1921.

GUSTAF W. ELMEN.